(12) United States Patent
Uemura

(10) Patent No.: US 12,079,527 B2
(45) Date of Patent: Sep. 3, 2024

(54) METHOD FOR CONTROLLING IMAGE FORMING SYSTEM, DISPLAYING SELECT SCREEN, AND ALLOWING TO CHANGE POWER MODES ACCORDING TO INSTRUCTION

(71) Applicant: CANON KABUSHIKI KAISHA, Tokyo (JP)

(72) Inventor: Takuya Uemura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/308,979

(22) Filed: Apr. 28, 2023

(65) Prior Publication Data

US 2023/0266933 A1  Aug. 24, 2023

Related U.S. Application Data

(63) Continuation of application No. 17/674,899, filed on Feb. 18, 2022, now Pat. No. 11,669,286.

(30) Foreign Application Priority Data

Mar. 15, 2021  (JP) .................................. 2021-041055

(51) Int. Cl.
*G06F 3/12*  (2006.01)
*H04N 1/00*  (2006.01)

(52) U.S. Cl.
CPC .......... *G06F 3/1236* (2013.01); *G06F 3/1221* (2013.01); *G06F 3/1229* (2013.01);
(Continued)

(58) Field of Classification Search
CPC .... G06F 3/1236; G06F 3/1221; G06F 3/1229; G06F 3/1292; H04N 1/00204; H04N 1/00411; H04N 1/00474; H04N 2201/0044
(Continued)

(56) References Cited

U.S. PATENT DOCUMENTS 8,593,663 B2  11/2013  Yoshida
2006/0274368 A1*  12/2006  Imine .................... G06K 15/00
358/1.15
(Continued)

FOREIGN PATENT DOCUMENTS

JP  2020039095 A  3/2020

OTHER PUBLICATIONS

Notice of Allowance issued in U.S. Appl. No. 17/674,899 mailed on Jan. 31, 2023.
(Continued)

*Primary Examiner* — Allen H Nguyen
(74) *Attorney, Agent, or Firm* — ROSSI, KIMMS & McDOWELL LLP

(57) ABSTRACT

A method of controlling an image forming system, the method including: determining whether or not a connection state enabling communication between an image forming apparatus and a second operation device has been established, in a case where an instruction is issued from a first operation device to the image forming apparatus; and displaying, in a case where it is determined in the determining that the connection state has been established, on a display of the first operation device, a selection screen for selection of whether or not the image forming apparatus is to be allowed to operate according to the instruction.

10 Claims, 13 Drawing Sheets

(52) U.S. Cl.
CPC ....... *G06F 3/1292* (2013.01); *H04N 1/00204* (2013.01); *H04N 1/00411* (2013.01); *H04N 1/00474* (2013.01); *H04N 2201/0044* (2013.01)

(58) Field of Classification Search
USPC ........................................................ 358/1.13
See application file for complete search history.

(56) References Cited

U.S. PATENT DOCUMENTS

| | | | |
|---|---|---|---|
| 2007/0263242 | A1 | 11/2007 | Takahashi |
| 2012/0182568 | A1* | 7/2012 | Isogai .................. G03G 15/502 358/1.13 |
| 2012/0300257 | A1 | 11/2012 | Nakajima |
| 2015/0043021 | A1* | 2/2015 | Ikeda .................. H04N 1/32561 358/1.13 |
| 2017/0070641 | A1 | 3/2017 | Matsutani |

OTHER PUBLICATIONS

Quayle Action issued in U.S. Appl. No. 17/674,899 mailed on Nov. 25, 2022.

\* cited by examiner

METHOD FOR CONTROLLING IMAGE FORMING SYSTEM, DISPLAYING SELECT SCREEN, AND ALLOWING TO CHANGE POWER MODES ACCORDING TO INSTRUCTION

BACKGROUND OF THE INVENTION

Field of the Invention

The present invention relates to an image forming system including an image forming apparatus, such as an electrophotographic copying machine or an electrophotographic printer (e.g., a laser beam printer or an LED printer), and a remote operation portion that operates the image forming apparatus through wireless communication.

Description of the Related Art

Until now, proposed has been a technology with a remote operation portion that operates an image forming apparatus through wireless communication.

Japanese Patent Application Laid-Open No. 2020-039095 discloses an operation device detachably attachable to an image forming apparatus. The operation device is capable of performing wireless communication with the image forming apparatus. The operation device is capable of communicating with a plurality of image forming apparatuses and is capable of issuing an instruction for "update of the address book" or "initial setting", collectively and simultaneously, to the plurality of image forming apparatuses. Thus, a plurality of times of issue of the same instruction is not required to the plurality of image forming apparatuses, resulting in easy operation. As above, Japanese Patent Application Laid-Open No. 2020-039095 discloses a configuration in which a single operation device operates a plurality of image forming apparatuses.

However, Japanese Patent Application Laid-Open No. 2020-039095 includes no description regarding control in a case where a plurality of operation devices operates a single image forming apparatus.

For example, in a case where an operation device (first operation device) and an image forming apparatus are in connection through wireless communication, another operation device (second operation device) tries to operate the image forming apparatus. Here, when the second operation device issues, to the image forming apparatus, a shutdown command or a command for transition to the power saving mode, the image forming apparatus operates according to the command. In that case, against the user having operated the image forming apparatus through the first operation device, the image forming apparatus operates unexpectedly, resulting in interruption of the work being currently processed.

SUMMARY OF THE INVENTION

According to a representative configuration of the present invention, provided is a method of controlling an image forming system including:

an image forming apparatus including an image forming unit configured to form an image on a sheet, based on image data, the image forming apparatus having a plurality of power modes different in power consumption;

a first operation device including a display configured to display information, the first operation device being capable of communicating with the image forming apparatus due to establishment of a first connection state between the image forming apparatus and the first operation device, the first operation device being to be operated in order to issue a plurality of instructions including an instruction for causing the image forming unit to perform image forming; and a second operation device capable of communicating with the image forming apparatus due to establishment of a second connection state between the image forming apparatus and the second operation device, the second operation device being to be operated in order to issue a plurality of instructions including an instruction for causing the image forming unit to perform image forming, the method comprising the steps of:

determining whether or not the second connection state has been established, in a case where a change instruction for a change between the plurality of power modes is issued from the first operation device to the image forming apparatus; and displaying, in a case where it is determined in the determining that the second connection state has been established, on the display, a selection screen for selection of whether or not the image forming apparatus is to be allowed to make a change between the plurality of power modes according to the change instruction.

Further features of the present invention will become apparent from the following description of exemplary embodiments with reference to the attached drawings.

DESCRIPTION OF THE EMBODIMENTS

Exemplary embodiments of the present invention will be exemplarily described in detail below with reference to the drawings. Note that, unless otherwise specified, the dimensions, material, and shape of each of the following constituent components and the relative arrangement thereof should not be construed to limit the scope of the invention.

First Embodiment

<Image Forming Apparatus>

Figure 1:
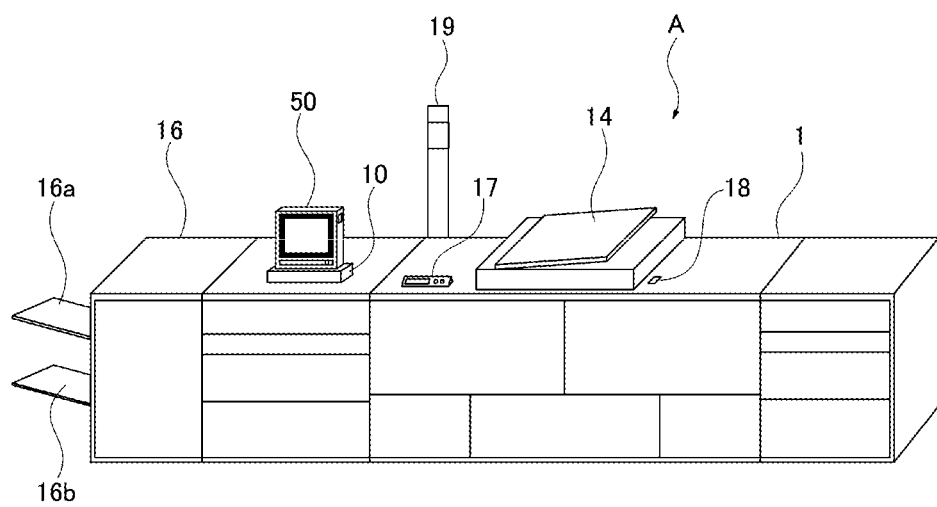
FIG. 1 is a schematic perspective view of an image forming system.

An image forming apparatus according to the present embodiment will be described with FIG. 1. FIG. 1 is a schematic perspective view of an exemplary image forming system equipped with the image forming apparatus.

As illustrated in FIG. 1, the image forming system A includes the image forming apparatus 1 that forms an image on a sheet S, and a processing apparatus 16 that performs processing, such as stapling, punching, or binding, to the sheet S having the image formed by the image forming apparatus 1. The image forming apparatus 1 has an upper portion provided with a reader 14 that optically reads an image of an original placed on a glass face not illustrated and converts the image into image data.

The image forming apparatus 1 includes a seesaw-type or tactile-type main power switch 18 that switches main power between on and off. The image forming apparatus 1 includes a display panel 17 that displays a lamp or an error code to notify a user of the state of the image forming apparatus, such as image forming processing in operation, suspension due to an error, or on standby. Even in a case where a remote operation panel 50 (operation device or remote operation portion) to be described below has been brought out from the image forming apparatus 1, the display panel 17 enables another user to give a minimum level of operation instruction. The image forming apparatus 1 includes a tower-type lamp 19 that turns on, off, or on and off its light source to notify the user at a distance of the state of the image forming apparatus.

The image forming apparatus 1 includes a panel attachment portion 10 to which the remote operation panel 50 is detachably attachable. The remote operation panel 50 will be described below.

Figure 2:
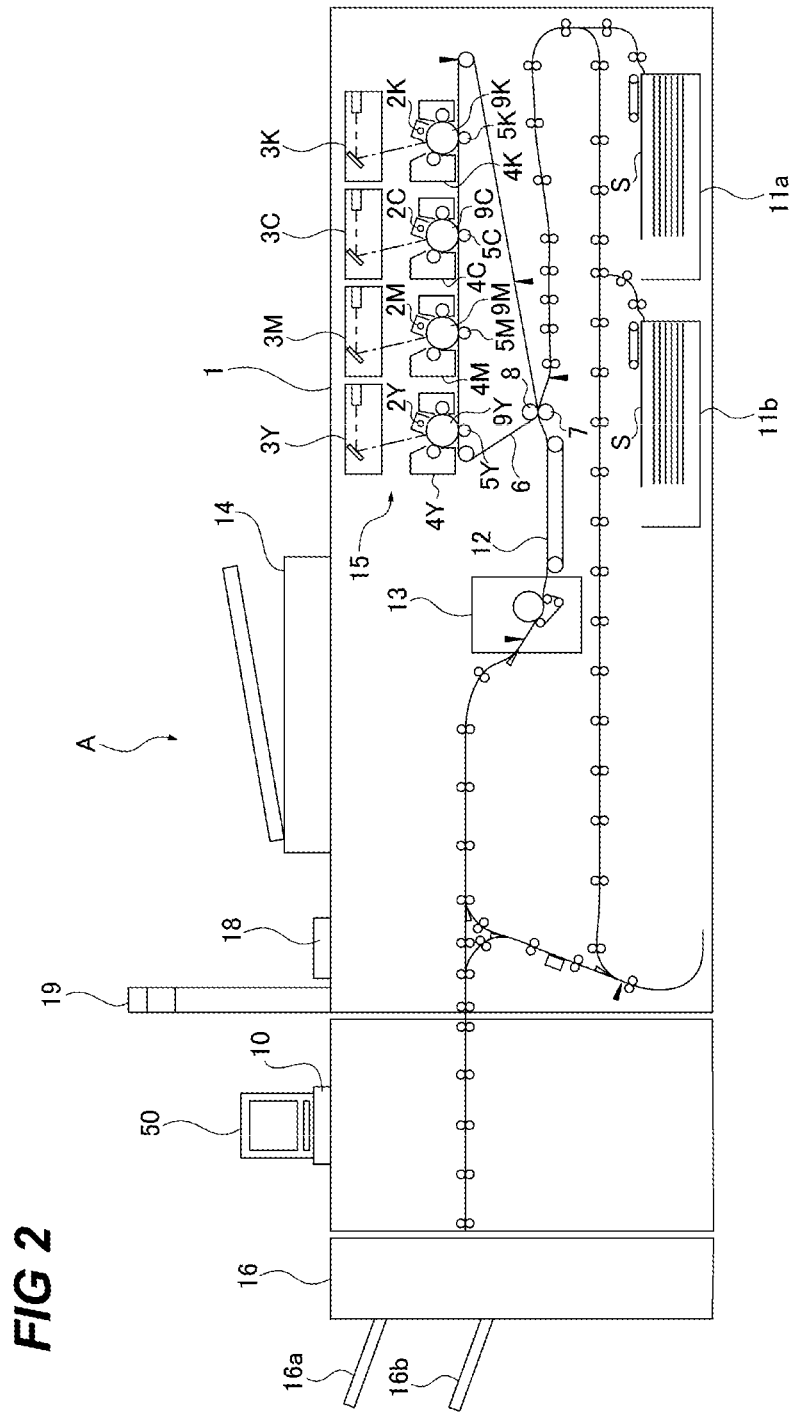
FIG. 2 is a schematic sectional view of the image forming system.

As illustrated in FIG. 2, the image forming apparatus 1 includes an image forming portion 15 (image forming unit) that forms an image on a sheet S. The image forming portion 15 includes photoconductive drums 9Y, 9M, 9C, and 9K, charging devices 2Y, 2M, 2C, and 2K, and developing devices 4Y, 4M, 4C, and 4K. The image forming portion 15 includes primary transfer rollers 5Y, 5M, 5C, and 5K, laser scanner units 3Y, 3M, 3C, and 3K, an intermediate transfer belt 6, a secondary transfer roller 7, and a secondary transfer counter roller 8.

Figure 4:
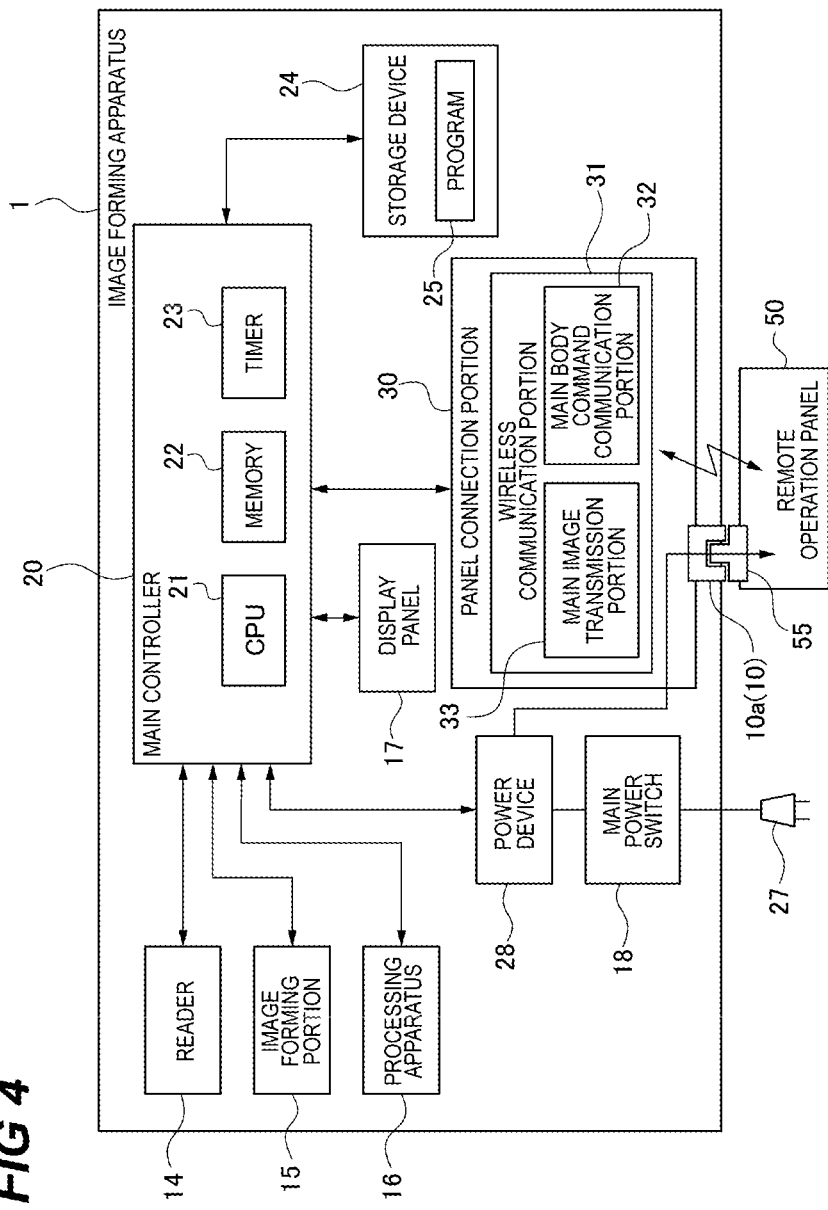
FIG. 4 is a block diagram of the system configuration of an image forming apparatus.

At the time of formation of an image by the image forming apparatus 1, first, an image forming job is input to a main controller 20 (refer to FIG. 4). Then, a sheet S housed in either a sheet cassette 11a or a sheet cassette 11b is fed to a secondary transfer portion of the secondary transfer roller 7 and the secondary transfer counter roller 8.

Meanwhile, in the image forming portion 15, first, the charging device 2Y charges the surface of the photoconductive drum 9Y. After that, according to the image data of the original read by the reader 14 or image data transmitted from an external device not illustrated through a network, the laser scanner unit 3Y irradiates the surface of the photoconductive drum 9Y with laser light, to form an electrostatic latent image on the surface of the photoconductive drum 9Y.

Next, the developing device 4Y causes yellow toner to adhere to the electrostatic latent image formed on the surface of the photoconductive drum 9Y, resulting in formation of a yellow toner image on the surface of the photoconductive drum 9Y. The toner image formed on the surface of the photoconductive drum 9Y is primary-transferred to the intermediate transfer belt 6 due to application of a primary transfer bias to the primary transfer roller 5Y.

Due to similar processes, a magenta toner image, a cyan toner image, and a black toner image are formed on the photoconductive drums 9M, 9C, and 9K, respectively. Then, due to application of a primary transfer bias to each of the primary transfer rollers 5M, 5C, and 5K, the corresponding toner image is transferred so as to be superimposed on the yellow toner image on the intermediate transfer belt 6. Thus, a full-color toner image corresponding to the image signal is formed on the surface of the intermediate transfer belt 6.

After that, due to circumferential run of the intermediate transfer belt 6, the full-color toner image is sent to the secondary transfer portion. Then, due to application of a secondary transfer bias to the secondary transfer roller 7, the full-color toner image on the intermediate transfer belt 6 is transferred to the sheet S at the secondary transfer portion. The sheet S having the toner image transferred thereto is conveyed to a fixing device 13 by a conveyance belt 12. Then, the fixing device 13 heats the sheet S under pressure, so that the toner image is fixed to the sheet S.

Next, the sheet S having the toner image fixed thereto is sent to the processing apparatus 16. In a case where the user has designated processing, such as stapling, punching, or binding, the sheet S sent to the processing apparatus 16 is subjected to the designated processing and then is discharged to a discharge tray 16a. In a case where the user has not designated any processing, the sheet S sent to the processing apparatus 16 is directly discharged to a discharge tray 16b without any processing.

<Remote Operation Panel>

The image forming apparatus 1 includes the remote operation panel 50 (remote operation portion) detachably attachable to the panel attachment portion 10 (attachment portion). Due to attachment to the panel attachment portion 10, the remote operation panel 50 is connected to the image forming apparatus 1. Specifically, when the remote operation panel 50 is attached to the panel attachment portion 10, a charging connector 55 of the remote operation panel 50 (refer to FIG. 3B) is electrically connected to a feeding connector 10a of the panel attachment portion 10 (refer to FIG. 4). Thus, the image forming apparatus 1 detects the connection of the remote operation panel 50, so that the image forming apparatus 1 charges a battery 67 in the remote operation panel 50 (refer to FIG. 5). The remote operation panel 50 is in connection with the image forming apparatus 1 through wireless communication instead of through a cable. Thus, the user can carry the remote operation panel 50 as a single item. Because the remote operation panel 50 is capable of wireless communication with the image forming apparatus 1, the remote operation panel 50 can operate the image forming apparatus 1 at a location away from the image forming apparatus 1 (in a range enabling wireless communication) due to detachment from the panel attachment portion 10. The remote operation panel 50 can operate a connected device, such as the processing apparatus 16 connected to the image forming apparatus 1.

Note that the remote operation panel 50 in the present embodiment serves as a dedicated terminal used only to operate the image forming apparatus 1. That is, the remote operation panel 50 is different from terminals of which their original uses are not to operate an image forming apparatus, for example, a mobile terminal, such as a smartphone, a laptop PC, and a tablet terminal. However, a control method to be described below can be applied to not only the remote operation panel 50 used only to operate the image forming apparatus 1 but also such a mobile terminal or tablet terminal as described above. That is, the control method according to the present embodiment can be applied to any terminal capable of communicating with an image forming apparatus through a network.

The remote operation panel 50 in the present embodiment performs wireless communication with the image forming apparatus 1, but the method of communication with the image forming apparatus 1 is not limited to wireless communication. For example, provided may be a wired type of communication enabling communication with the image forming apparatus 1 through a LAN cable. However, such a wired type of communication limits the range in which the remote operation panel 50 can be carried. The image forming system according to the present embodiment expects a plurality of remote operation panels 50 to operate a single image forming apparatus 1. According to the present embodiment of the invention, it is desirable to solve problems in a situation where a single image forming apparatus 1 is operated from mutually separate and different locations. In consideration of a longer mutual distance that is more likely to cause a problem, the present embodiment of the invention is particularly effective with a scheme of wireless communication.

Note that, herein, exemplified has been the remote operation panel 50 (remote operation portion) detachably attachable to the image forming apparatus 1. Instead of being detachably attachable to such an image forming apparatus, the remote operation panel 50 may be provided separately from the image forming apparatus and may operate the image forming apparatus through wireless communication.

Figure 3A:
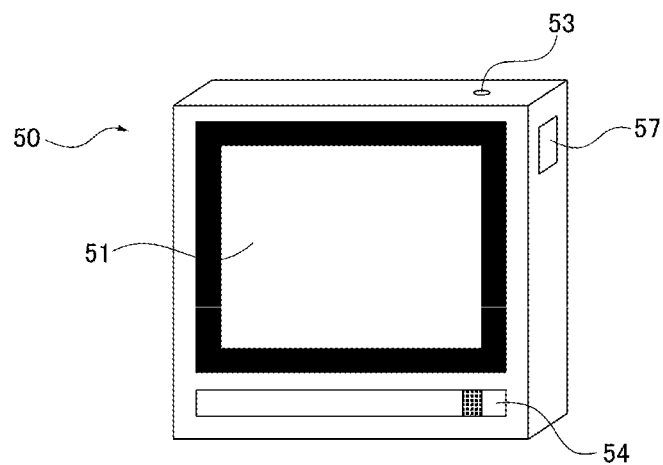
FIGS. 3A and 3B are schematic perspective views of a remote operation panel.
Figure 3B:
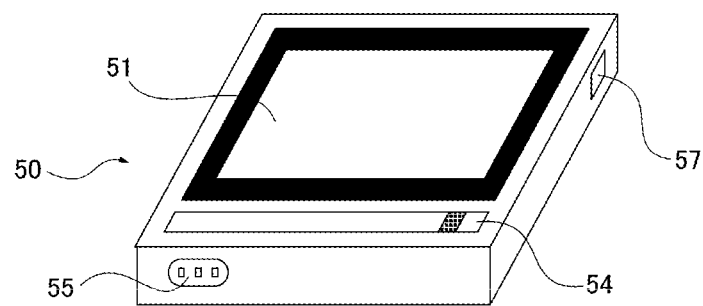

FIGS. 3A and 3B are schematic perspective views of the remote operation panel 50. As illustrated in FIGS. 3A and 3B, the remote operation panel 50 includes a speaker portion 53 that outputs sound, a state display portion 54 that gives notice of the state of the remote operation panel 50 by lighting, non-lighting, or flashing, and a power switch 57 that switches the power of the remote operation panel 50 between on and off. Herein, the state display portion 54 includes an LED, but this is not limiting.

The remote operation panel 50 has a touch-panel display 51 including a display portion and an operation portion (touch panel 52 in FIG. 5) integrated together, in which the display portion is capable of displaying a display image received from the image forming apparatus 1 and the operation portion detects a touch operation from the user. The user touches a finger to a key (input portion or button) displayed on the display 51 to make an input, so that an instruction regarding image forming, such as a setting in the number of sheets for image forming or a setting in the size of a sheet S, or an instruction regarding image reading, such as a setting in the size of an original, can be given to the image forming apparatus 1. As above, the display 51 displays a plurality of instructions including an instruction for causing the image forming portion 15 to perform image forming. Then, the user touches an instruction (key or icon) displayed on the display 51, so that the image forming apparatus 1 operates based on the instruction.

<System Configuration of Image Forming Apparatus>

Next, the system configuration of the image forming apparatus 1 will be described with FIG. 4. FIG. 4 is a block diagram of an exemplary system configuration of the image forming apparatus 1.

As illustrated in FIG. 4, the image forming apparatus 1 includes the main controller 20 including a CPU 21, a memory 22, and a timer 23. The main controller 20 is in connection with, for example, a storage device 24, the reader 14, the image forming portion 15, the processing apparatus 16, and the display panel 17. The main controller 20 (CPU 21) controls the operation of each connected portion.

The reader 14 reads an original to generate image data. The image forming portion 15 performs image forming processing to form an image on a sheet based on the image data. The processing apparatus 16 performs processing, such as stapling, punching, or binding, to printed matter, such as the sheet subjected to the image forming processing.

The storage device 24 has a program 25 regarding control of the image forming apparatus 1, various display images, and print data, stored therein. Here, the program 25 stored in the storage device 24 corresponds to a group of pieces of software for causing the main controller 20 to function to perform various types of processing. Examples of the various display images stored in the storage device 24 include display images (image data) to be displayed on the remote operation panel 50. Examples of the display images to be displayed on the remote operation panel 50 include display images illustrated in FIGS. 8A, 8B, 8C, and 8D, to be described below.

The CPU 21 reads and executes the program 25 stored in the storage device 24. The CPU 21 reads, from the storage device 24, a display image to be displayed on the remote operation panel 50, and then transmits the display image to the remote operation panel 50. The memory 22 temporarily stores data due to execution of the program 25 by the CPU 21. That is, based on the program 25 stored in the storage device 24, with the memory 22 as a work area, the CPU 21 controls, for example, the reader 14, the image forming portion 15, and the processing apparatus 16 that are connected to the main controller 20, to perform processing, such as formation of an image on a sheet. For example, based on the program 25, the CPU 21 performs image processing to the image data read from the original by the reader 14. The CPU 21 stores such image data generated as above into the storage device 24 and transfers the image data to the image forming portion 15, to perform image forming processing.

The timer 23 measures time in various types of processing of the main controller 20. For example, according to the count value of the timer 23, the main controller 20 determines whether to cause the image forming apparatus 1 to transition from a standby mode to a sleep mode less in power consumption than the standby mode.

The main controller 20 is in connection with a panel connection portion 30 that establishes connection with the remote operation panel 50. The panel connection portion 30 includes the panel attachment portion 10 having the feeding connector 10a to which the remote operation panel 50 is connected, and a wireless communication portion 31 that performs wireless communication with the remote operation panel 50. The charging connector 55 of the remote operation panel 50 is connected to the feeding connector 10a of the panel attachment portion 10. The main controller 20 is capable of detecting the connection between the feeding connector 10a of the panel attachment portion 10 and the charging connector 55 of the remote operation panel 50. When the main controller 20 detects the connection, a power device 28 to be described below supplies power to the remote operation panel 50 through the connection between the feeding connector 10a and the charging connector 55.

The wireless communication portion 31 includes a main command communication portion 32 and a main image transmission portion 33. The CPU 21 reads a display image stored in the storage device 24 and transmits the display image to the remote operation panel 50 through the main image transmission portion 33 of the wireless communication portion 31. The CPU 21 generates an instruction to the remote operation panel 50 and transmits the instruction to the remote operation panel 50 through the main command communication portion 32. The CPU 21 receives a notification or instruction generated in the remote operation panel 50 through the main command communication portion 32. Note that, in the present embodiment, the main command communication portion 32 and the main image transmission portion 33 are separately provided, but both thereof may be collectively provided on a single communication line.

The main controller 20 is in connection with the power device 28. The power device 28 receives power from a commercial source of power through a power plug 27, performs conversion to power for use in each device, and supplies the power to each device. Specifically, first, when the main power switch 18 is switched from off to on, the power device 28 supplies power to the main controller 20. After that, based on an instruction from the main controller 20, the power device 28 supplies power to, for example, the reader 14, the image forming portion 15, the processing apparatus 16, the display panel 17, the remote operation panel 50 attached to the panel attachment portion 10, the wireless communication portion 31, and the storage device 24.

When the main power switch 18 is switched off, based on an instruction from the main controller 20 (CPU 21), the power device 28 stops supplying power. Even without switching the main power switch 18 off, based on an instruction from the main controller 20 (CPU 21), the power device 28 can switch the main power switch 18 off so as to stop supplying power. For example, when abnormality occurs or when an instruction for power-off is received from the user, the main power switch 18 is switched off based on an instruction from the main controller 20 (CPU 21). As above, the main controller 20 enables switching of power supply to each device between on and off.

<Various Types of Power Modes of Image Forming Apparatus>

The image forming apparatus 1 is capable of transitioning between the standby mode (first power mode) and the sleep mode (second power mode) less in power consumption than the standby mode. The main controller 20 (CPU 21) controls to make a reduction in power consumption.

When the image forming apparatus is in the standby mode, the power device 28 supplies power to the main controller 20. Then, based on an instruction from the main controller 20, the power device 28 supplies power to the reader 14, the image forming portion 15, the processing apparatus 16, the display panel 17, and the panel connection portion 30. Note that, in a case where the remote operation panel 50 has been attached to the panel attachment portion 10, the power device 28 supplies power to the remote operation panel 50 attached to the panel attachment portion 10. Even in the standby mode, based on an instruction from the main controller 20, the power device 28 supplies power to a device to be used but supplies no power to any device not to be used. For example, when the user selects image reading, power is supplied to the reader 14 but no power is supplied to the image forming portion 15 and the processing apparatus 16.

In a case where the image forming apparatus is not used, the image forming apparatus transitions from the standby mode to the sleep mode. The case where the image forming apparatus is not used corresponds, for example, to a case where the image forming apparatus has not been used for a certain period of time or a case where an instruction for transition to the sleep mode is received from the user through the remote operation panel 50. When the image forming apparatus transitions from the standby mode to the sleep mode, based on an instruction from the main controller 20, the power device 28 continues supplying power to the panel connection portion 30. On the other hands, based on an instruction from the main controller 20, the power device 28 stops supplying power to the reader 14, the image forming portion 15, the processing apparatus 16, and the display panel 17. Note that, in a case where the remote operation panel 50 has been attached to the panel attachment portion 10, the power device 28 continues supplying power to the remote operation panel 50 attached to the panel attachment portion 10.

When an input from the user is detected in the sleep mode, the image forming apparatus 1 returns from the sleep mode to the standby mode. For example, when an instruction for return from the sleep mode is received from the user through the remote operation panel 50, the image forming apparatus returns from the sleep mode to the standby mode.

<System Configuration of Remote Operation Panel>

Figure 5:
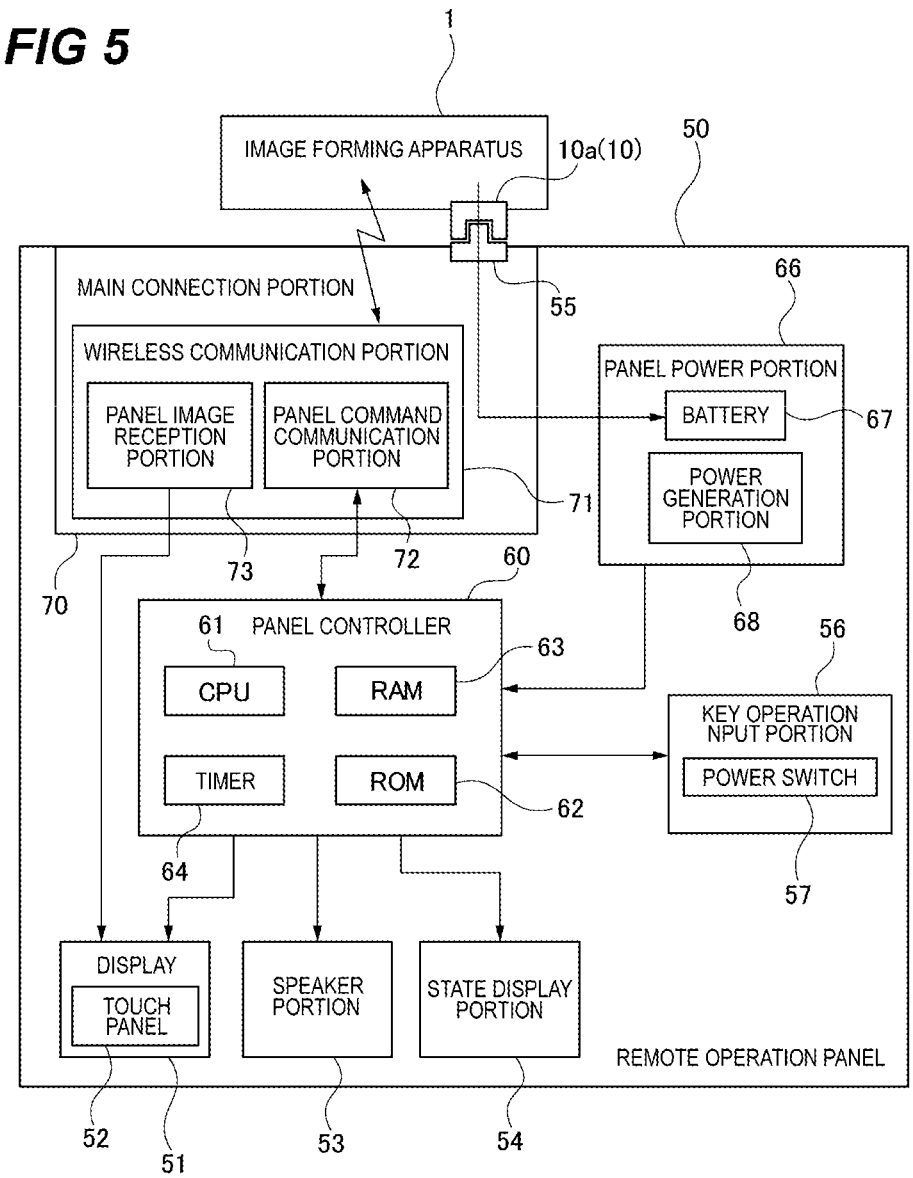
FIG. 5 is a block diagram of the system configuration of the remote operation panel.

Next, the system configuration of the remote operation panel 50 will be described with FIG. 5. FIG. 5 is a block diagram of the system configuration of the remote operation panel 50.

As illustrated in FIG. 5, the remote operation panel 50 includes a panel controller 60 including a CPU 61, a ROM 62, a RAM 63, and a timer 64. The timer 64 measures time in various types of processing of the panel controller 60.

The ROM 62 (storage portion) has data, such as various types of programs regarding control of the remote operation panel 50, stored therein. Based on a control program stored in the ROM 62, the CPU 61 performs various types of computing. The RAM 63 temporarily stores data. That is, based on the control program stored in the ROM 62, with the RAM 63 as a work area, the CPU 61 (controller) controls, for example, the display 51, the speaker portion 53, and the state display portion 54 that are connected to the panel controller 60.

The ROM 62 serves as a storage portion having stored information regarding control to be described below. In addition to the various types of programs regarding control of the remote operation panel 50, the ROM 62 has the information regarding control, stored therein. The information regarding control includes information on establishment of connection with the image forming apparatus and information acquired from the image forming apparatus. Examples of the information acquired from the image forming apparatus include information regarding the state of the image forming apparatus, such as the standby mode, the sleep mode, or error detection, and count information regarding the number of printed sheets.

The remote operation panel 50 includes a main connection portion 70 that establishes connection with the image forming apparatus 1. The main connection portion 70 includes the charging connector 55 to which the feeding connector 10a of the image forming apparatus 1 is connected, and a wireless communication portion 71 that performs wireless communication with the image forming apparatus 1.

The wireless communication portion 71 includes a panel command communication portion 72 connected to the CPU 61 and a panel image reception portion 73 connected to the display 51. The CPU 61 generates an instruction or notification to the image forming apparatus 1 and transmits the instruction or notification to the main command communication portion 32 of the image forming apparatus 1 through the antenna not illustrated of the panel command communication portion 72. The CPU 61 receives, through the panel command communication portion 72, an instruction or information transmitted from the main command communication portion 32 of the image forming apparatus 1.

The panel image reception portion 73 receives, through an antenna not illustrated, image data transmitted from the main image transmission portion 33 of the image forming apparatus 1, and then converts the image data into image data to be displayed on the display 51. Note that, in the present embodiment, the main connection portion 70 includes the panel command communication portion 72 and the panel image reception portion 73, but both thereof may be collectively provided on a single communication line.

The wireless communication portion 71 performs wireless communication with the wireless communication portion 31 of the image forming apparatus 1 through Wi-Fi direct communication as a form of communication enabling direct connection between the image forming apparatus 1 and the remote operation panel 50. Miracast, as a display transmission technique to which such a scheme of Wi-Fi direct communication as above is applied, is used, for example, in mobile phones, displays, and projectors. Note that the form of communication enabling direct connection between the image forming apparatus 1 and the remote operation panel 50 is not necessarily Wi-Fi wireless communication, and thus a different scheme of wireless communication, such as Bluetooth or NFC, may be provided.

In a case where a plurality of remote operation panels 50 is in communication with a single image forming apparatus 1, the communication is performed in a timesharing. Specifically, the state of connection between the image forming apparatus 1 and a remote operation panel 50 is interrupted when a certain period of time passes, and the image forming apparatus 1 next establishes a state of connection with another remote operation panel 50. As above, the image forming apparatus 1 establishes a state of individual connection with each of the plurality of remote operation panels 50. Because a state of one-to-one connection is usually established, the image forming apparatus 1 does not establish a state of simultaneous connection with the plurality of remote operation panels 50. More specifically, in the present embodiment, in a case where the image forming apparatus 1 tries to communicate with two remote operation panels 50, the duration of connection is 5 seconds. That is, for the destination of connection, the image forming apparatus 1 makes a switch every 5 seconds between the remote operation panels 50. Note that the duration of connection described herein is just exemplary and thus, in a case where at least three remote operation panels 50 are each connected to the image forming apparatus 1, the duration of connection may be changed.

As described above, the image forming apparatus 1 cannot establish a state of simultaneous connection with the plurality of remote operation panels 50. The "state of connection" given herein corresponds to the state of repetition of connection and disconnection with a predetermined duration of connection. That is, in the above case where the image forming apparatus 1 tries to communicate with two remote operation panels 50, when the duration of disconnection between the image forming apparatus 1 and one remote operation panel 50 exceeds, for example, 10 seconds, the one remote operation panel 50 and the image forming apparatus 1 are defined as being out of connection. The CPU 21 of the image forming apparatus 1 determines whether or not the image forming apparatus 1 and a remote operation panel 50 are in connection.

The display 51 serves as a display portion capable of displaying information stored in advance in the ROM 62 (storage portion) or information received from the image forming apparatus through the wireless communication portion 71. Therefore, the CPU 61 makes a switch for an image to be output on the display 51 such that an image that the remote operation panel 50 possesses is output or an image received through the wireless communication portion 71 is output. Here, for example, the "information stored in advance" in the ROM 62 includes the model number and name of each POD machine. In general, as an aspect in which a user purchases an image forming system A, it can be thought that a set of an image forming apparatus 1 and a remote operation panel 50 is purchased. In this case, the ROM 62 of the remote operation panel 50 has the model number and name of the image forming apparatus 1 to be purchased as a set, registered in advance therein. Examples of the timing at which the model number and name are registered in the ROM 62 include the time before the image forming apparatus 1 and the remote operation panel 50 are shipped from a factory and the time of installation of the image forming apparatus 1, for example, at the workplace to which the user belongs. After installing the image forming apparatus 1, for example, in the workplace to which the user belongs, a serviceman is required to register, in the ROM 62, the model number and name of the image forming apparatus 1. Needless to say, the user itself may conduct such registration work.

Alternatively, the registration work described above may be conducted in use of the image forming apparatus 1. Specifically, the remote operation panel 50 can search for the image forming apparatus 1 connectable wirelessly. For example, the model number and name of the image forming apparatus 1 searched for, and IP address are displayed on the display 51 of the remote operation panel 50. The user compares the model number and name of the image forming apparatus 1 that the user has grasped, with the model number and name displayed on the display 51. If matching, the user conducts registration work, for example, by touching the display 51.

Figure 6:
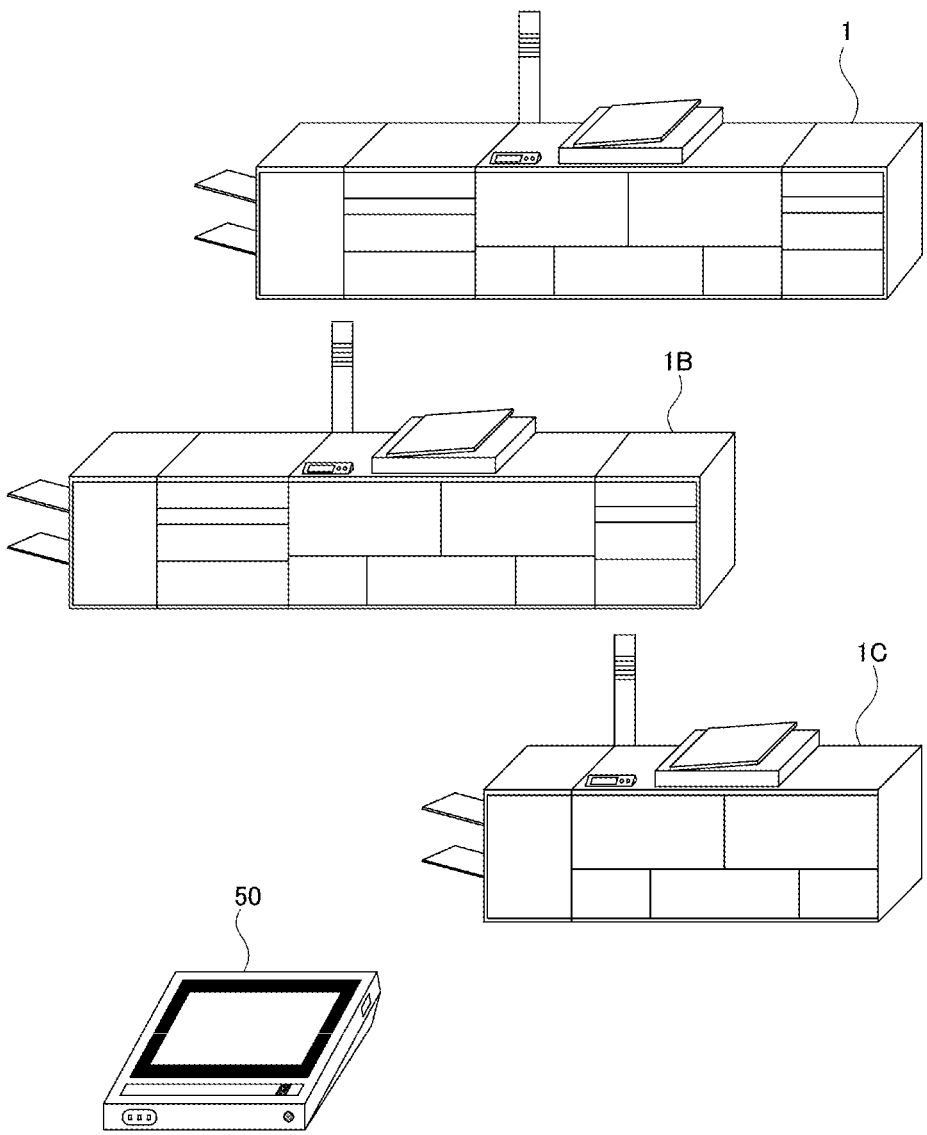
FIG. 6 illustrates the configuration of a network including the remote operation panel and a plurality of image forming apparatuses.

As illustrated in FIG. 6, the remote operation panel 50 can operate a plurality of image forming apparatuses 1B and 1C in addition to the image forming apparatus 1 through wireless communication. Thus, the remote operation panel 50 performs, according to the procedure described above, the work of additional registration of the respective model numbers and names of the image forming apparatuses 1B and 1C, as the second and subsequent apparatuses, to the ROM 62.

The display 51 serves as a touch-panel display (operation display portion) including the display portion and the touch panel 52 serving as an operation portion that detects a touch operation from the user, integrated together. Because the display 51 has the touch panel 52 disposed in superimposition, the user fingers the display 51 through the touch panel 52, to make an operation. The display 51 displays a screen to the user through the touch panel 52.

Figure 7:
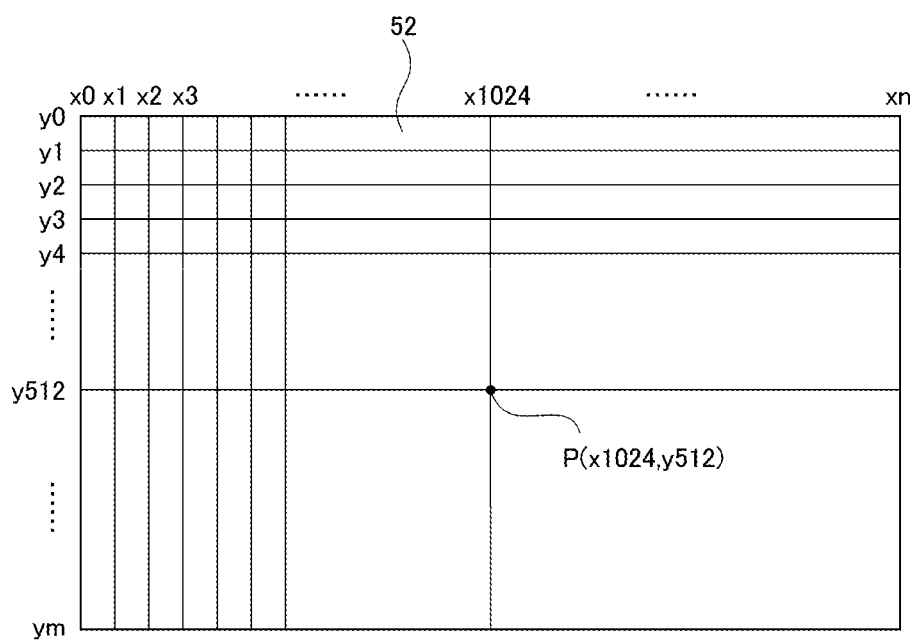
FIG. 7 illustrates a coordinate display on the touch panel of the remote operation panel.

Here, when the user operates the touch panel 52, the CPU 61 of the remote operation panel 50 transmits, to the image forming apparatus 1, operation information on the touch panel 52 as coordinate information. Such a process will be described below. FIG. 7 illustrates a coordinate display on the touch panel 52 of the remote operation panel 50. As illustrated in FIG. 7, the touch panel 52 has n divisions in the X direction and m divisions in the Y direction. The number of divisions depends on the type of a touch panel, and the touch panel resistive in type in the present embodiment has 2048 divisions in the X direction and 1024 divisions in the Y direction.

With respect to the origin (0, 0), coordinates are denoted with (X, Y) according to the distance from the origin. For example, position P illustrated in FIG. 7 is denoted with (1024, 512) as its coordinates because of the location away by 1024 in the X direction and by 512 in the Y direction from the origin. Coordinate data is transmitted from the touch panel 52 (refer to FIG. 5) to the CPU 61 of the remote operation panel 50. Then, based on an instruction from the CPU 61, the coordinate data is transmitted from the panel command communication portion 72 to the image forming apparatus 1. Note that, in the present embodiment, because of an 8-bit length of communication between the image forming apparatus 1 and the remote operation panel 50, the numerical value of the coordinate data is divided by 8 for transmission. That is, the coordinates (1024, 512) are replaced with (128, 64) for transmission.

The remote operation panel 50 includes a panel power portion 66. The panel power portion 66 includes a battery 67 and a power generation portion 68, and is connected to the panel controller 60. The battery 67 is achieved by a rechargeable secondary battery and serves as the main power source of the remote operation panel 50. When the charging connector 55 of the remote operation panel 50 is connected to the feeding connector 10a of the image forming apparatus 1, the power device 28 of the image forming apparatus 1 supplies power to the battery 67, so that the battery 67 is charged. The power generation portion 68 adjusts power from the battery 67 to voltage available to each constituent portion described above in the remote operation panel 50. When the power switch 57 is switched from off to on, the power adjusted by the power generation portion 68 is supplied to the panel controller 60, the display 51, the speaker portion 53, the state display portion 54, and the main connection portion 70.

The remote operation panel 50 includes a key operation input portion 56, separately from the touch-panel display 51 serving as an operation display portion. The key operation input portion 56 includes a hardware key provided in an area out of the display 51 of the remote operation panel 50. The key operation input portion 56 includes, as the hardware key, the power switch 57 that switches the power of the remote operation panel 50 between on and off. Herein, as the hardware key of the key operation input portion 56, the power switch 57 is exemplified, but this is not limiting.

<Collective Operation of Plurality of Image Forming Apparatuses by Remote Operation Panel>

The remote operation panel 50 can issue a common operation instruction, collectively, to the plurality of image forming apparatuses 1, 1B, and 1C through wireless communication. The remote operation panel 50 will be described.

The remote operation panel 50 converts an operation instruction from the user into a command and then transmits the command to an image forming apparatus connected wirelessly. The timing at which the remote operation panel 50 transmits such a command to the image forming apparatus corresponds to the time when a valid operation is received from the user. Thus, when an invalid operation is received from the user or when no input has been made, the remote operation panel 50 transmits no command to the image forming apparatus.

The valid operation corresponds to an intentional operation from the user to the remote operation panel 50, namely, a user operation for causing the image forming apparatus to operate, such as a touch-panel input to the coordinates of a software key displayed on the screen or a hardware-key input. The invalid operation corresponds to an unintentional operation from the user, such as an accidental touch on the touch panel 52 while the remote operation panel 50 is being carried. For example, the invalid operation corresponds to a user operation that does not cause the image forming apparatus to operate, such as a touch-panel input to any coordinates at which no software key is displayed or a numeric-keypad input with no numerical-value input required. The panel controller 60 of the remote operation panel 50 determines whether the operation is valid or invalid.

In the present embodiment, given has been the description in which the timing at which the remote operation panel transmits a command to the image forming apparatus corresponds to the time when a valid operation is received from the user, but the timing may be more particular. Examples of the more particular timing include the time when a job execution command is given, the time when a start button is pressed, and the time when an operation is made on a hardware key.

In a case where the remote operation panel 50 is in connection with a plurality of image forming apparatuses, the panel controller 60 performs the control of switching the image forming apparatus to communicate with. The control of switching the image forming apparatus to communicate with that the panel controller 60 performs, will be described.

In a case where the remote operation panel 50 is in connection with the plurality of image forming apparatuses 1, 1B, and 1C, the remote operation panel 50 serves as the group owner and a network for Wi-Fi direct communication is formed from the remote operation panel 50 to each image forming apparatus. Between the remote operation panel 50 and the plurality of image forming apparatuses 1, 1B, and 1C, one-to-multi connection is established and one-to-one communication is established. Thus, even with the remote operation panel 50 in connection wirelessly with the plurality of image forming apparatuses 1, 1B, and 1C, for example, while the remote operation panel 50 and the image forming apparatus 1 are in communication, the remote operation panel 50 does not communicate with the image forming apparatus 1B and the image forming apparatus 1C. For collective transmission of commands from the remote operation panel 50, technically, instead of simultaneous transmission, performed is sequential transmission of commands in which a command is transmitted to the image forming apparatus 1, then, a command is transmitted to the image forming apparatus 1B, and then a command is transmitted to the image forming apparatus 1C.

That is, while switching the image forming apparatus to communicate with, the CPU 61 (controller) transmits a common operation instruction to the plurality of image forming apparatuses 1, 1B, and 1C, to each of the plurality of image forming apparatuses in sequence. As above, according to the present embodiment, because the user does not need to conduct the work of switching the operation target, the user feels as if an operation instruction has been transmitted, collectively, to the plurality of image forming apparatuses 1.

The remote operation panel 50 performs information acquisition from the image forming apparatus connected to a network for Wi-Fi direct communication while being out of communication with the image forming apparatus as the operation target. On the background, the remote operation panel 50 transmits an information acquisition command to each image forming apparatus that is not the operation target, in sequence, so that the remote operation panel 50 acquires information on each image forming apparatus that is not the operation target. Because of information update on the background, the user does not need to pay attention.

Here, the information that the remote operation panel 50 acquires from an image forming apparatus is, for example, information regarding whether or not the image forming apparatus should be included in the collective operation target. Specifically, included are information on the state of the image forming apparatus, such as on standby, on the job, in sleep, an error occurring, or already in a state of common operation, and information on the connection with another remote operation panel. Note that, because the sleep state (in sleep) is often set in stages, the sleep state can be set into a state allowing signal interchange. In this case, even when receiving a signal for information acquisition, the image forming apparatus is not brought out of sleep. Note that, depending on setting, the sleep state corresponds to a state allowing no communication, and thus, in that case, the image forming apparatus can be excluded from the collective operation target.

Information acquisition from an image forming apparatus is not limited to be due to transmission of an information acquisition command from the remote operation panel 50. Even with no transmission of an information acquisition command from the remote operation panel, for information acquisition, the remote operation panel may receive information transmitted from an image forming apparatus in connection. For example, at the timing at which connection is established between an image forming apparatus in connection with the remote operation panel 50 and another remote operation panel, the remote operation panel 50 can receive notification from the image forming apparatus, for information acquisition.

Information acquisition from an image forming apparatus is not limited to information acquisition on the background. For example, at the timing at which the remote operation panel performs a collective operation, the remote operation panel may transmit a command for acquisition of information regarding the apparatus state, in order to check whether the state has changed after the timing of acquisition of the latest apparatus information, for information acquisition.

<Screens to be Displayed on Remote Operation Panel>

The remote operation panel 50 can operate the plurality of image forming apparatuses 1B and 1C in addition to the image forming apparatus 1 through wireless communication as described above (refer to FIG. 6). FIGS. 8A, 8B, 8C, and 8D illustrate exemplary screens each displayed on the display 51 of the remote operation panel 50.

The remote operation panel 50 is connected to the plurality of image forming apparatuses 1, 1B, and 1C through wireless communication. Herein, wireless communication is performed based on a form of communication enabling direct connection between the remote operation panel and each image forming apparatus (Wi-Fi direct communication). The remote operation panel 50 operates one image forming apparatus individually from the plurality of image forming apparatuses 1, 1B, and 1C in connection wirelessly. This is referred to as an individual operation mode. Thus, in order for the user to grasp which image forming apparatus is currently the operation target from the plurality of image forming apparatuses in connection wirelessly with the remote operation panel 50, information indicating an image forming apparatus as the main operation target is displayed on the screen. For example, on the screen illustrated in FIG. 8A, "main A" is displayed as information indicating the image forming apparatus 1 (refer to FIG. 6) as the main operation target. On the screen illustrated in FIG. 8B, "main B" is displayed as information indicating the image forming apparatus 1B (refer to FIG. 6) as the main operation target.

Figure 8A:
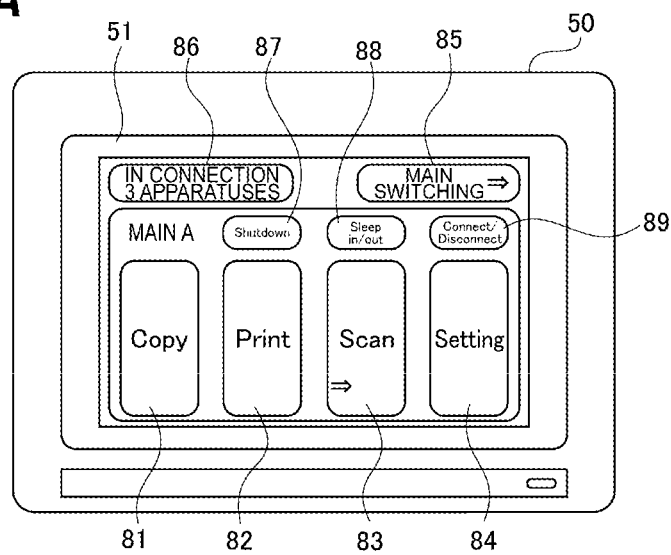
FIGS. 8A, 8B, 8C, and 8D illustrate exemplary screens each displayed on the display of the remote operation panel.
Figure 8B:
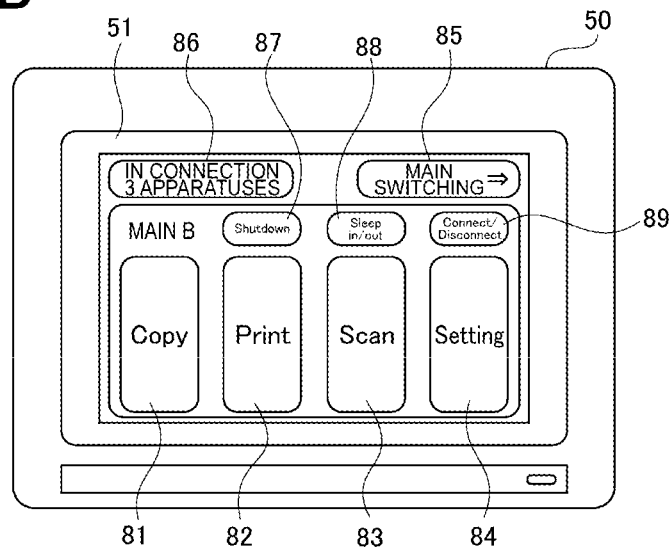
Figure 8C:
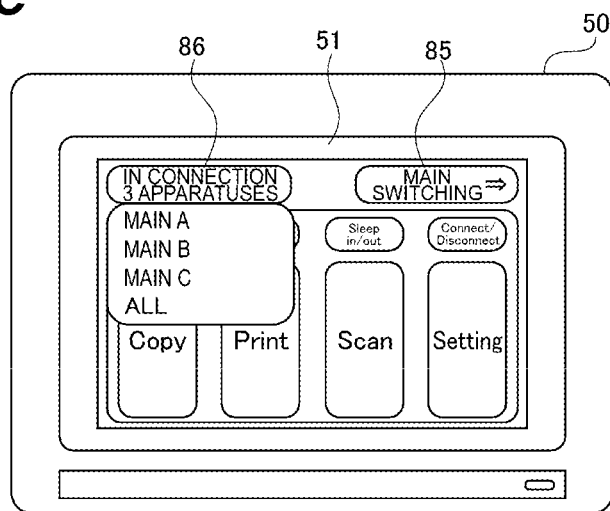

The screen illustrated in FIG. 8A, 8B, or 8C displayed on the display 51 of the remote operation panel 50 corresponds to a screen displayed in the individual operation mode. On the screen illustrated in FIG. 8A, 8B, or 8C displayed on the display 51 of the remote operation panel 50, buttons 81, 82, 83, and 84 each serve as a button for inputting an operation instruction to a single image forming apparatus. Specifically, the button 81 serves as a button for inputting an operation instruction for copy to the image forming apparatus. The button 82 serves as a button for inputting an operation instruction for print to the image forming apparatus. The button 83 serves as a button for inputting an operation instruction for scan to the image forming apparatus. The button 84 serves as a button for inputting information regarding setting for the image forming apparatus.

The remote operation panel 50 operates, collectively, the plurality of image forming apparatuses 1, 1B, and 1C in connection wirelessly. This is referred to as a collective operation mode. Thus, the remote operation panel 50 includes a first input portion for transition to the collective operation mode for operating the plurality of image forming apparatuses 1, 1B, and 1C, collectively. The remote operation panel 50 includes a second input portion for inputting a common operation instruction to the plurality of image forming apparatuses 1, 1B, and 1C.

On the screen illustrated in FIG. 8A, 8B, or 8C, a main switching button 85 functions as the first input portion. Herein, a long press on the main switching button 85 causes a transition from the screen in the individual operation mode described above (refer to FIG. 8A, 8B, or 8C) to a screen in the collective operation mode (refer to FIG. 8D, a collective operation screen). In other words, caused is a transition to a collective-setting-screen display step of displaying a collective setting screen (refer to FIG. 8D) for setting an instruction for a change in power mode, such as a shutdown command to be described below, from the remote operation panel 50, collectively, to the plurality of image forming apparatuses 1, 1B, and 1C.

Note that, on each of the screens illustrated in FIGS. 8A, 8B, 8C, and 8D, displayed is information regarding the number of image forming apparatuses connected wirelessly to the remote operation panel 50. The information is displayed on a portion functioning as a selection button 86 for selecting an image forming apparatus as the operation target. A touch on the selection button 86 causes display of a list of the image forming apparatuses in connection. Specifically, as illustrated in FIG. 8C, "main A" indicating the image forming apparatus 1, "main B" indicating the image forming apparatus 1B, "main C" indicating the image forming apparatus 1C, and "ALL" indicating all of the plurality of image forming apparatuses are list-displayed as a list. Selection of any of "main A", "main B", and "main C" from the selection button 86 and a touch on the main switching button 85 enable a switch to a screen for operating, individually, any one of the plurality of image forming apparatuses 1, 1B, and 1C (individual operation mode). Selection of "ALL" from the selection button 86 and a touch on the main switching button 85 enable a switch to a screen for operating, collectively, the plurality of image forming apparatuses (collective operation mode). As above, the selection button 86 and the main switching button 85 can function as the first input portion described above.

A switch to an image forming apparatus as the operation target is not limited to a method of operating the main switching button 85 or a method of selection from the list with the selection button 86. For example, provided may be a method of switching with a flick operation on the screen illustrated in FIG. 8A, 8B, 8C, or 8D.

Figure 8D:
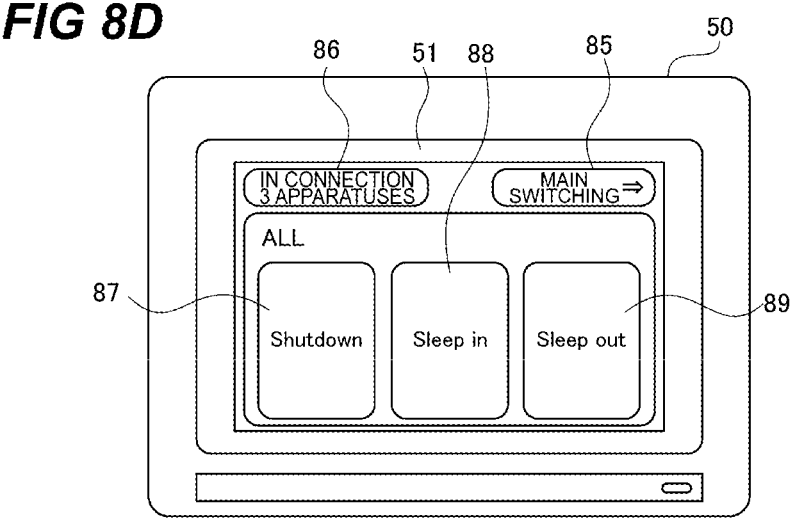

The screen, illustrated in FIG. 8D, displayed on the display 51 of the remote operation panel 50 corresponds to a screen displayed in the collective operation mode. On the screen, illustrated in FIG. 8D, displayed on the display 51 of the remote operation panel 50, buttons 87, 88, and 89 each serve as a button (second input portion) for inputting a common operation instruction to the plurality of image forming apparatuses. Specifically, the button 87 serves as a button for inputting an operation instruction for a shutdown command for turning off power to the image forming apparatuses. The button 88 serves as a button for inputting an operation instruction for a sleep-in command for causing the image forming apparatuses to transition to the sleep mode less in power consumption. The button 89 serves as a button for inputting an operation instruction for a sleep-out command for causing the image forming apparatuses to return from the sleep mode.

Note that, on each of the screens illustrated in FIGS. 8A, 8B, and 8C, buttons 87, 88, and 89 are displayed. However, the screens illustrated in FIGS. 8A, 8B, and 8C each correspond to a screen displayed in the individual operation mode. Thus, the buttons 87, 88, and 89 displayed on each of the screens illustrated in FIGS. 8A, 8B, and 8C each do not function as the second input portion described above but function to give an operation instruction to a single image forming apparatus as the operation target.

Above exemplified have been the button functioning as the first input portion for transition to the collective operation mode for operating, collectively, the plurality of image forming apparatuses and the buttons functioning as the second input portion for inputting a common operation instruction to the plurality of image forming apparatuses. That is, exemplified has been the remote operation panel 50 in which the first input portion and the second input portion are each displayed on the display 51 (operation display portion). However, this is not limiting. For example, provided may be a button for transmitting a command to all the image forming apparatuses in connection, regardless of any image forming apparatus as the operation target. That is, on the screen displayed on the display 51 of the remote operation panel 50, displayed may be a single button (input portion) having both of the function of the first input portion and the function of the second input portion.

Figure 9A:
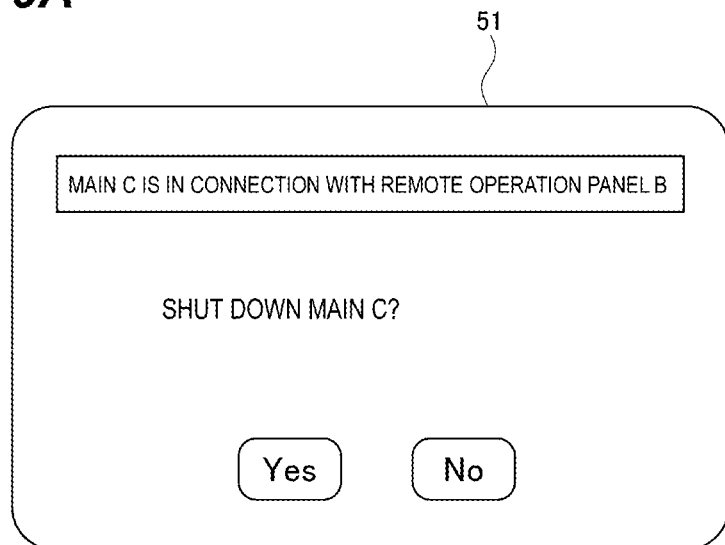
FIGS. 9A and 9B illustrate exemplary "selection screens" each displayed on the display of the remote operation panel.
Figure 9B:
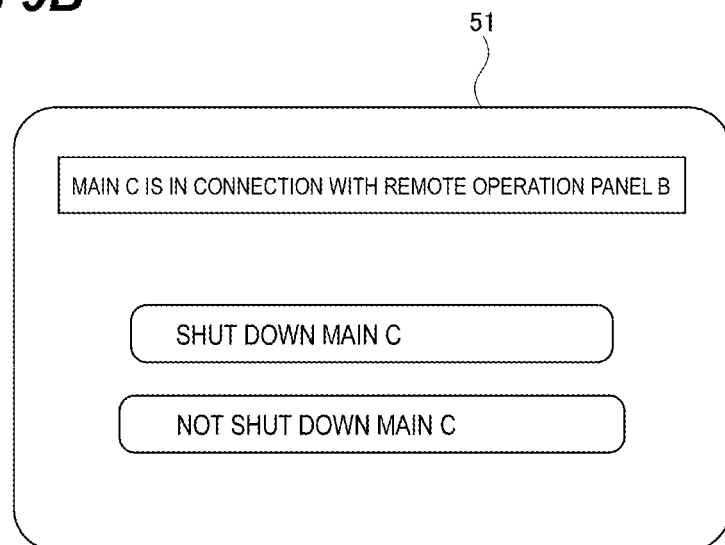

FIGS. 9A and 9B illustrate selection screens each prompting the user to select whether or not to cause the image forming apparatus 1 to operate based on a particular instruction. For example, a remote operation panel A in a plurality of remote operation panels 50 issues the same instructions, simultaneously, to the plurality of image forming apparatuses (mains A, B, and C). Note that the "instruction" herein corresponds, for example, to a shutdown command. At this time, for example, an image forming apparatus (e.g., the main C) and a remote operation panel B are in connection. In this case, the instruction for shutdown from the remote operation panel A to the main C causes the main C to shut down. If there is a user who is operating the main C through the remote operation panel B, the main C shuts down against the user at an unintended timing.

Thus, in a control system according to the present embodiment, as illustrated in FIG. 9A, the message "the main C is in connection with another remote operation panel (remote operation panel B)" is displayed together with a selection screen on the display 51 of the remote operation panel A. As illustrated in FIG. 9A, the selection screen serves as a screen prompting the user to select whether or not to allow the operation "shut down the main C". In a selection-screen display step, the "selection screen" is displayed on the display 51 of the remote operation panel A.

Note that, as the selection screen, as illustrated in FIG. 9B, provided may be a screen prompting the user to select either "shut down the main C" or "not shut down the main C".

<Common Operation Instruction in Collective Operation Mode>

Figure 10:
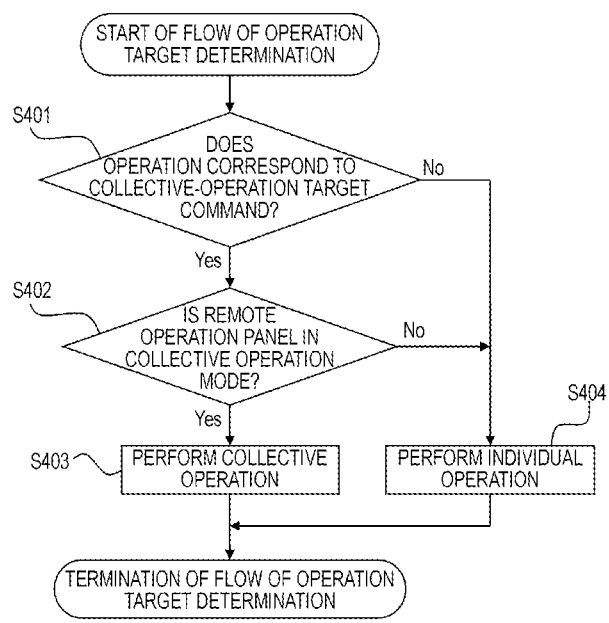
FIG. 10 is a flowchart of control in which a remote operation panel performs operation target determination in a first embodiment.

Next, control in which the remote operation panel 50 determines an image forming apparatus as the operation target, will be described. FIG. 10 is a flowchart of operation target determination that the CPU 61 (controller) of the remote operation panel 50 performs in a first embodiment.

In the first embodiment, the CPU 61 (controller) transitions to the collective operation mode and transmits an input common operation instruction, collectively, to the plurality of image forming apparatuses 1, 1B, and 1C in connection wirelessly.

When the user makes an operation to the remote operation panel 50, the CPU 61 determines whether the operation corresponds to a collective-operation target command (S401). The collective-operation target command corresponds to a common operation instruction that the CPU 61 transmits to the plurality of image forming apparatuses 1, 1B, and 1C. Herein, examples of the collective-operation target command include a shutdown command, a sleep-in command, and a sleep-out command to the image forming apparatuses. For example, the CPU 61 detects a touch operation on any of the buttons 87, 88, and 89 on the screen displayed on the display of the remote operation panel 50, to determine that the operation corresponds to the collective-operation target command (shutdown command, sleep-in command, or sleep-out command).

Examples of the collective-operation target command include a counter information acquisition command and an error log acquisition command, in addition to the shutdown command, sleep-in command, and sleep-out command to the image forming apparatuses.

Here, counter information corresponds to information regarding how many sheets have been printed by the corresponding image forming apparatus. The image forming apparatus has stored the total number of printed sheets since the first printing by the user after shipped from a factory. The information regarding the number of printed sheets may be stored in the memory of the image forming apparatus or may be stored in a storage area out of the image forming apparatus through a server. As above, the number of sheets printed in color or the number of sheets printed in black and white has been stored, as the executed-job history, in the memory of the image forming apparatus or a memory out of the image forming apparatus. When the user gives the remote operation panel 50 an instruction for execution of the counter information acquisition command, the counter information described above can be acquired and displayed on the remote operation panel 50.

An error log corresponds to the history of an error occurred in the image forming apparatus. In a case where a paper jam has occurred, the occurrence is stored, as error information, for example, into the memory of the image forming apparatus. When the user gives the remote operation panel 50 an instruction for execution of the error log acquisition command, the error log described above can be acquired and displayed on the remote operation panel 50. Such acquisition of the error log enables verification of when and what type of error occurred and verification of whether the error has been solved.

In a case where the operation corresponds to the collective-operation target command (Yes in S401), the CPU 61 determines whether the remote operation panel 50 is in the collective operation mode (S402). In a case where the remote operation panel 50 is in the collective operation mode (Yes in S402), the CPU 61 transmits, as a common operation instruction, the command input from the user, collectively, to all the plurality of image forming apparatuses 1, 1B, and 1C in connection wirelessly (S403). Then, after the collective operation instruction, the flow of operation target determination terminates.

Meanwhile, in a case where the operation does not correspond to the collective-operation target command (No in S401) or in a case where the remote operation panel 50 is out of the collective operation mode (No in S402), the CPU 61 determines that the remote operation panel 50 is in the individual operation mode. In a case where it is determined that the remote operation panel 50 is in the individual operation mode, the CPU 61 transmits the command only to a single image forming apparatus as the main operation target from the plurality of image forming apparatuses in connection with the remote operation panel 50 (S404). Then, after the individual operation instruction, the flow of operation target determination terminates.

As described above, according to the present embodiment, a single remote operation panel 50 can transmit a common operation instruction, collectively, to a plurality of image forming apparatuses, resulting in a simple operation that is not intricate.

Second Embodiment

Figure 11:
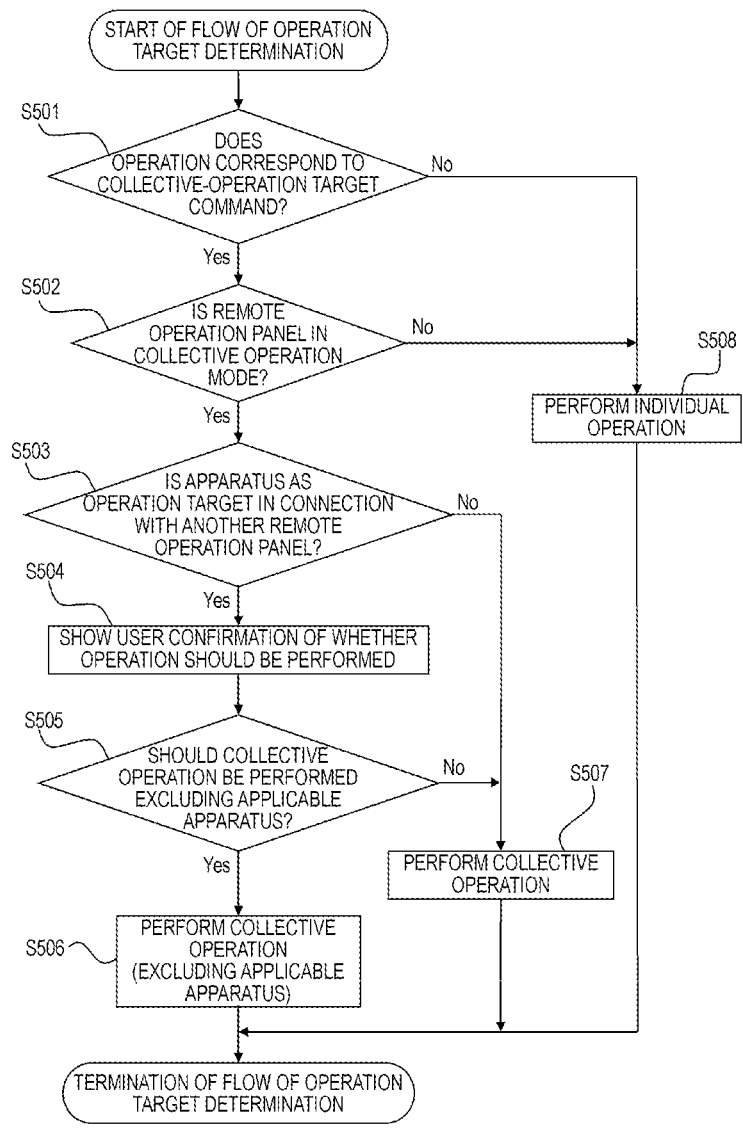
FIG. 11 is a flowchart of control in which a remote operation panel performs operation target determination in a second embodiment.

Next, control in which a remote operation panel 50 in an image forming apparatus according to a second embodiment determines an image forming apparatus as the operation target, will be described. FIG. 11 is a flowchart of operation target determination that the CPU 61 (controller) of the remote operation panel 50 performs in the second embodiment.

Note that the schematic configuration of the image forming apparatus including the remote operation panel is similar to that in the embodiment described above, and thus the description thereof will be omitted herein.

In the second embodiment, in a case where an image forming apparatus in connection with another remote operation panel is present in a plurality of image forming apparatuses 1, 1B, and 1C, the CPU 61 (controller) shows the user a confirmation of whether or not a common operation instruction should be transmitted to the image forming apparatus.

When the user makes an operation to the remote operation panel 50, the CPU 61 determines whether the operation corresponds to a collective-operation target command (S501). The collective-operation target command is similar to that in the embodiment described above.

In a case where the operation corresponds to the collective-operation target command (Yes in S501), the CPU 61 determines whether the remote operation panel 50 is in the collective operation mode (S502). In a case where the remote operation panel 50 is in the collective operation mode (Yes in S502), the CPU 61 determines whether or not an image forming apparatus in connection with another remote operation panel is present in the image forming apparatuses as the collective operation target (S503, a determination step). Note that such determination herein may be performed by the CPU 21 of the image forming apparatus 1.

In a case where an image forming apparatus as the collective operation target is in connection with another remote operation panel (Yes in S503), the user is shown a confirmation of whether or not a collective operation should be performed to the applicable image forming apparatus (S504, a display step). For example, the display 51 of the remote operation panel 50 displays a confirmation screen indicating whether or not a collective operation should be performed to the applicable image forming apparatus, to prompt the user to make an input.

In a case where an instruction for no collective operation to the applicable apparatus is given from the user (Yes in S505), the CPU 61 transmits, as a common operation instruction, the command input from the user, collectively, to all the image forming apparatuses as the collective operation target excluding the applicable apparatus (S506).

Meanwhile, in a case where any image forming apparatus as the collective operation target is not in connection with another remote operation panel (No in S503) or in a case where an instruction for including the applicable apparatus as the collective operation target is given from the user (No in S505), the CPU 61 transmits, as a common operation instruction, the command input from the user, collectively, to all the image forming apparatuses as the collective operation target (S507). Then, after the collective operation instruction, the flow of operation target determination terminates.

Meanwhile, in a case where the operation does not correspond to the collective-operation target command (No in S501) or in a case where the remote operation panel is out of the collective operation mode (No in S502), the CPU 61 determines that the remote operation panel is in the individual operation mode. In a case where it is determined that the remote operation panel 50 is in the individual operation mode, the CPU 61 transmits the command only to a single image forming apparatus as the main operation target from the plurality of image forming apparatuses in connection with the remote operation panel 50 (S508). Then, after the individual operation instruction, the flow of operation target determination terminates.

As described above, according to the present embodiment, a single remote operation panel 50 can transmit a common operation instruction, collectively, to a plurality of image forming apparatuses, resulting in a simple operation that is not intricate. Furthermore, the user can select whether or not to transmit a common operation instruction to an image forming apparatus in connection with another remote operation panel.

Third Embodiment

Figure 12:
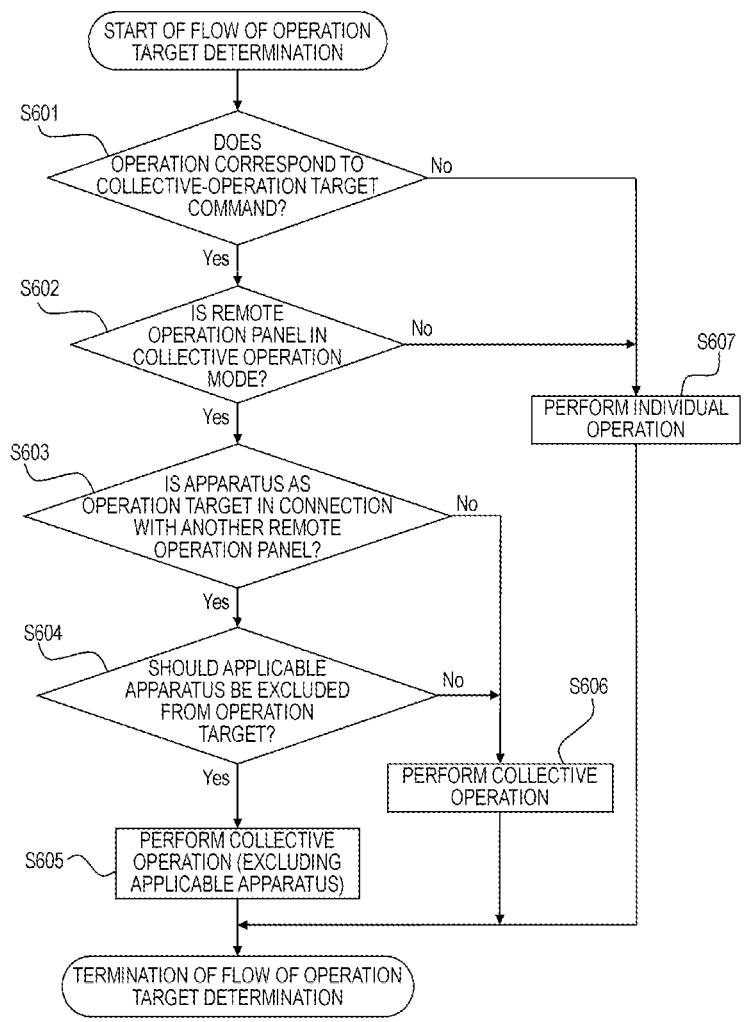
FIG. 12 is a flowchart of control in which a remote operation panel performs operation target determination in a third embodiment.

Next, control in which a remote operation panel 50 in an image forming apparatus according to a third embodiment determines an image forming apparatus as the operation target, will be described. FIG. 12 is a flowchart of operation target determination that the CPU 61 (controller) of the remote operation panel 50 performs in the third embodiment.

Note that the schematic configuration of the image forming apparatus including the remote operation panel is similar to that in the embodiment described above, and thus the description thereof will be omitted herein.

In the third embodiment, the CPU 61 (controller) does not transmit a common operation instruction to an image forming apparatus in connection with another remote operation panel, in a plurality of image forming apparatuses 1, 1B, and 1C, but transmits the common operation instruction to the other image forming apparatuses.

When the user makes an operation to the remote operation panel 50, the CPU 61 determines whether the operation corresponds to a collective-operation target command (S601). The collective-operation target command is similar to that in the embodiment described above.

In a case where the operation corresponds to the collective-operation target command (Yes in S601), the CPU 61 determines whether the remote operation panel 50 is in the collective operation mode (S602). In a case where the remote operation panel 50 is in the collective operation mode (Yes in S602), the CPU 61 determines whether an image forming apparatus in connection with another remote operation panel is present in the image forming apparatuses as the collective operation target (S603).

In a case where an image forming apparatus as the collective operation target is in connection with another remote operation panel (Yes in S603), the CPU 61 determines whether to perform a collective operation to the applicable image forming apparatus (S604). Note that, herein, the condition of exclusion from the collective operation target is set in advance. The setting is stored in the ROM 62 of the remote operation panel 50, and the CPU 61 performs control based on information stored in the ROM 62.

In a case where the setting indicates that no collective operation is to be performed to the applicable apparatus (Yes in S604), the CPU 61 transmits, as a common operation instruction, the command input from the user, collectively, to all the image forming apparatuses as the collective operation target excluding the applicable image forming apparatus (S605). Then, after the collective operation instruction, the flow of operation target determination terminates.

Meanwhile, in a case where any image forming apparatus as the collective operation target is not in connection with another remote operation panel (No in S603) or in a case where the setting indicates that the applicable apparatus is to be included in the collective operation target (No in S604), the CPU 61 transmits, as a common operation instruction, the command input from the user, collectively, to all the image forming apparatuses as the collective operation target (S606). Then, after the collective operation instruction, the flow of operation target determination terminates.

Meanwhile, in a case where the operation does not correspond to the collective-operation target command (No in S601) or in a case where the remote operation panel is out of the collective operation mode (No in S602), the CPU 61 determines that the remote operation panel is in the individual operation mode. In a case where it is determined that the remote operation panel 50 is in the individual operation mode, the CPU 61 transmits the command only to a single image forming apparatus as the main operation target from the plurality of image forming apparatuses in connection with the remote operation panel 50 (S607). Then, after the individual operation instruction, the flow of operation target determination terminates.

Note that, herein, as the condition of exclusion from the collective operation target, exemplified has been an image forming apparatus in connection with another remote operation panel, but this is not limiting. Thus, appropriate setting may be performed. For example, as the condition of exclusion from the collective operation target, an image forming apparatus already in common operation may be set.

As described above, according to the present embodiment, a single remote operation panel 50 can transmit a common operation instruction, collectively, to a plurality of image forming apparatuses, resulting in a simple operation that is not intricate. Furthermore, with an image forming apparatus in connection with another remote operation panel, excluded from the collective operation target, a common operation instruction can be transmitted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-041055, filed Mar. 15, 2021, which is hereby incorporated by reference herein in its entirety.

What is claimed is:

1. An image forming system comprising:
a plurality of image forming apparatuses each having an image forming unit that forms an image on a sheet; and
an operating portion that is wirelessly connectable to each of the plurality of image forming units, and that accepts operations by a user, the operating portion providing operation instructions, which are instructions for operations related to image forming, to each of the plurality of image forming units based on the operations by the user,
wherein the plurality of image forming apparatuses each have a first operation mode and a second operation mode and the operating portion is switchable between the first operation mode and the second operation mode,
wherein, when the operating portion is in the first operation mode, different operation instructions are given to each of the plurality of image forming apparatuses that are wirelessly connected to the operating portion, and
wherein, when the operating portion is in the second operation mode, common operation instructions are given to each of the plurality of image forming apparatuses that are wirelessly connected to the operating portion.

2. The image forming system according to claim 1,
wherein the operating portion further comprises a displaying portion for displaying settings related to the image forming, and
wherein the displaying portion displays a list of the plurality of image forming apparatuses that are wirelessly connected to the operating portion.

3. The image forming system according to claim 2,
wherein, when the operating portion is in the first operation mode, the operation instructions are given to a selected image forming apparatus among the plurality of image forming apparatuses displayed in the list by the displaying portion.

4. The image forming system according to claim 1,
wherein each of the plurality of image forming apparatuses is capable of transitioning between a first power mode in which images can be formed on sheets and a second power mode in which power consumption is lower than the first power mode.

5. The image forming system according to claim 4,
wherein, when the operating portion is in the second operation mode, the operation instructions include an instruction to shift an image forming apparatus, which is in the first power mode, to the second power mode.

6. The image forming system according to claim 4,
wherein, when the operating portion is in the second operation mode, the operation instructions include an instruction to shift an image forming apparatus, which is in the second power mode, to the first power mode.

7. The image forming system according to claim 5, wherein the second power mode includes a state in which the plurality of image forming apparatuses are shut down.

8. The image forming system according to claim 6, wherein the second power mode includes a state in which the plurality of image forming apparatuses are shut down.

9. The image forming system according to claim 1, wherein the operating portion and the plurality of image forming apparatuses are connected wirelessly without a local area network.

10. The image forming system according to claim 1, wherein the operating portion and the plurality of image forming apparatuses are connected by WiFi Direct.

* * * * *